(12) United States Patent
Moon

(10) Patent No.: US 6,523,122 B1
(45) Date of Patent: Feb. 18, 2003

(54) COMPUTER SYSTEM FOR DISPLAYING SYSTEM STATE INFORMATION INCLUDING ADVANCED CONFIGURATION AND POWER INTERFACE STATES ON A SECOND DISPLAY

(75) Inventor: Byung-Do Moon, Kyunggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/391,632

(22) Filed: Sep. 7, 1999

(30) Foreign Application Priority Data

Sep. 4, 1998 (KR) ............................. 98-36597

(51) Int. Cl.[7] .............................. G06F 1/30; G06F 1/26; G06F 1/28
(52) U.S. Cl. ........................ 713/300; 713/320; 713/324
(58) Field of Search ................. 713/300, 320, 713/324

(56) References Cited

U.S. PATENT DOCUMENTS

| 5,410,711 | A | | 4/1995 | Stewart |
| 5,548,763 | A | | 8/1996 | Combs et al. |
| 5,748,158 | A | * | 5/1998 | Kim ............................ 345/33 |
| 5,758,172 | A | | 5/1998 | Seo |
| 5,799,198 | A | | 8/1998 | Fung |
| 5,937,200 | A | | 8/1999 | Frid et al. |
| 5,938,765 | A | | 8/1999 | Dove et al. |
| 5,983,354 | A | * | 11/1999 | Poisner et al. ............... 710/305 |
| 6,065,121 | A | * | 5/2000 | Hobson et al. .............. 713/300 |
| 6,105,142 | A | * | 8/2000 | Goff et al. ................... 713/320 |

* cited by examiner

Primary Examiner—Thomas Lee
Assistant Examiner—Suresh K Suryawanshi
(74) Attorney, Agent, or Firm—Robert E. Bushnell, Esq.

(57) ABSTRACT

A computer system has a display device for displaying system state information, so that advanced configuration and power interface specification (ACPI) state information and power state information are displayed. Thus, a user can easily confirm the current state of a computer system and a usable duration of a portable computer.

30 Claims, 5 Drawing Sheets

Fig. 1

(Prior Art)

Fig. 2

*(Prior Art)*

COMPUTER SYSTEM FOR DISPLAYING SYSTEM STATE INFORMATION INCLUDING ADVANCED CONFIGURATION AND POWER INTERFACE STATES ON A SECOND DISPLAY

CLAIM OF PRIORITY

This application makes reference to, incorporates the same herein, and claims all benefits accruing under 35 U.S.C. §119 from my application COMPUTER SYSTEM HAVING DISPLAY DEVICE FOR DISPLAYING SYSTEM STATE INFORMATION AND CONTROL METHOD THEREOF filed with the Korean Industrial Property Office on Sep. 4, 1998 and there duly assigned Ser. No. 36597/1998.

BACKGROUND OF THE INVENTION

1. Field of the Invention

The present invention relates to a computer system, and more particularly to a computer system with a function that a user can recognize a current state of a computer system having a display device for displaying system state information.

2. Description of the Related Art

Computer technology has remarkably advanced over the last decade. According to the advancement, various functions (for example, a communication function and an audio/video refresh function) have been added to a computer system. A computer system having these functions is called a 'multimedia computer'.

Further, the technology for reducing power consumption of a computer system has been advanced. In general, there are two methods for minimizing the power consumption of a computer system. First, when data are not inputted from an input device during a fixed time, a display operation of a display device is stopped. Second, when access to a hard disk drive (HDD) is not performed, the hard disk drive (HDD) stops operating. This power management technology can efficiently extend a duration of using a battery of a portable computer.

Recently, a special display device for displaying system state information is installed in a computer system. A vacuum fluorescent display (VFD) and a liquid crystal display (LCD) are generally used as the display device in a desk-top computer and a portable computer, respectively.

A desk-top computer includes a display monitor, a body, a keyboard, and a mouse. A vacuum fluorescent display (VFD) panel is installed in a front bezel of the computer body. The state data of a computer system is displayed in the vacuum fluorescent display (VFD) panel. For example, a current time and an operating state of an audio player and a video player are displayed in the vacuum fluorescent display (VFD).

Also, a portable computer includes a body and a hinge-combined liquid crystal display (LCD) panel. As described above, a small-sized liquid crystal display (LCD) panel for displaying system state information is installed in the body. For example, the access state of a floppy disk drive and a hard disk drive is displayed in the small-sized liquid crystal display (LCD) panel.

Therefore, special display device for displaying of the computer system state information is installed in the computer system, so that a convenient use environment is supplied for a user.

As mentioned previously, a computer system possesses a power management function. A power management system (PMS) having a simple power management function is applied to the computer system in the early stage, but an advanced power management system (APMS) having advanced power management function is recently applied to the computer system. In this regard, an advanced configuration and power interface specification (ACPI) is suggested by Intel corporation, Microsoft corporation, and Toshiba corporation, for example. A detailed description of the advanced configuration and power interface specification (ACPI) is disclosed in Advanced Configuration and Power Interface Specification Reversion 1.0, for example.

Computer system states according to the advanced configuration and power interface specification (ACPI) and transition of each state will now be described.

The total system state of a computer system is classified into five (5) states as follows: a Legacy state, a G0 state, a G1 state, a G2 state, and a G3 state. The Legacy state is a disable state of advanced configuration and power interface specification (ACPI) function and power management is not performed. The G0 state is a working state and the computer system is normally operated. The G1 state is a sleeping state and power consumption is generally reduced. The G2 state is a soft off state and minimal power consumption is only generated so as to sense a soft switch (a switch for power on/off of the computer system). The G3 state is a mechanical off state and the power supply is wholly intercepted.

If power is supplied when the advanced configuration and power interface specification (ACPI) function of a computer system is enabled, the computer system is classified into six (6) sleeping states S0 through S5. The sleeping states S0, S1 through S4, and S5 correspond to the G0 state, G1 state, and G2 state, respectively. According to the operating states of the computer system, in states S1 through S4, power consumption is reduced step by step in response to the operating states.

According to the state of the computer system, power consumption of devices (for example, a central processing unit (CPU), a compact disc-read only memory (CD-ROM), a hard disk drive (HDD), and a modem) installed in the computer system is reduced step by step. The steps are classified into C0 through C3 (in the central processing unit (CPU)) and D0 through D3 (in the compact disc-read only memory (CD-ROM), the hard disk drive (HDD), and the modem).

In the foregoing advanced configuration and power interface specification (ACPI), power consumption is reduced step by step in accordance with operating states of a computer system. As mentioned above, information according to the advanced configuration and power interface specification (ACPI) is not displayed in a special device for displaying state information of the computer system. Thus, a user cannot know a proceeding step of the power consumption reduced by the advanced configuration and power interface specification (ACPI) and cannot distinguish the G2 state (soft off state) and the G3 state (mechanical off state). Then, if a main board is changed so as to repair the computer system, the main board can be damaged owing to abruptly applied power.

U.S. Pat. No. 5,410,711 to Gregory entitled *Portable Computer With BIOS-Independent Power Management*, discloses a personal computer in which a microcontroller, separate from the main processor, is used for power-management functions. It is disclosed the power-management microcontroller can take control of the system bus to provide BIOS-independent power management.

U.S. Pat. No. 5,548,763 to Combs, et al. entitled *Desk Top Computer System Having Multi-level Power Management*, disclose a computer system having four states of power management: a normal operating state, a standby state, a suspend state, and an off state. It is disclosed the standby state is characterized by devices, such as a video controller and a hard drive, being placed into a low-power mode transparent to the operating system and the applications executing on the computer system. The suspend state is disclosed as characterized by executing code being interrupted and the state of the computer system being saved to a file on the hard drive in such a manner that system power can be removed after the state of the computer system is saved to the hard drive. Later, after system power is restored, it is disclosed the state of the computer system is resumed by reading from the hard drive and loading it in such a manner that the operating system and application programs are not adversely affected. The normal operating state and the off state is disclosed as corresponding to typical on and off states of computer systems.

U.S. Pat. No. 5,758,172 to Seo entitled *Apparatus And Method For Displaying PMS Information In A Portable Computer*, discloses an apparatus and method for displaying power management system (PMS) information in a portable computer includes a video random access memory (RAM) for storing the power management system (PMS) information as a preset data configuration. It is disclosed a keyboard controller outputs a signal corresponding to an operating state represented by a user key selection and a system interrupt signal. A power management system (PMS) controller outputs a corresponding signal after sensing a present charging/discharging state of the voltage of a battery. It is disclosed a real-time clock (RTC) stores data corresponding to the mode and level of the power management system (PMS) set during an initial set-up step of computer operation. It is disclosed a video controller reads the power management system (PMS) information stored in the video random access memory (RAM), and displays the information as a preset data configuration on a display unit when a corresponding key signal is output from the keyboard controller. A central processing unit (CPU) it is disclosed reads the present battery level from the power management system (PMS) controller, reads the mode and level of the power management system (PMS) stored in the real-time clock (RTC) when an interrupt signal is generated from the keyboard controller, and controls the operation of displaying the power management system (PMS) information.

U.S. Pat. No. 5,799,198 to Fung entitled *Activity Monitor For Computer System Power Management*, discloses a power conservation system for use in a computer system. It is disclosed the power system has an activity monitor and a plurality of power modes of operation, wherein the activity monitor detects the activity level of the computer system through hardware and/or software. By controlling the power mode of operation in response to the activity of the computer system, it is disclosed the power consumption of the computer system can be controlled.

U.S. Pat. No. 5,937,200 to Frid, et al. entitled *Using Firmware To Enhance The Functionality Of A Controller*, disclose a single controller that handles keyboard functions and ACPI configuration and power management functions, while providing priority to keyboard functions so that there is no end user-perceptible compromise of keyboard functionality. When an interrupt is received by the microcontroller, it is determined whether the interrupt is an embedded controller interrupt received at the embedded controller host interface or a keyboard interrupt received at the keyboard host interface. It is disclosed if the interrupt is a keyboard interrupt, the keyboard function is handled in a standard fashion. If the interrupt is an embedded controller interrupt for an ACPI configuration or power management function, it is disclosed a burst timer is started and the command is handled by a command dispatcher.

U.S. Pat. No. 5,938,765 to Dove, et al. entitled *System And Method For Initializing A Multinode Multiprocessor Computer System*, disclose an apparatus and method for initializing a shared-memory, Multinode multiprocessor computer system. It is disclosed the nodes in the multiprocessor computer system separately and independently run standard PC-based BIOS routines in parallel for initialization of the nodes.

SUMMARY OF THE INVENTION

An object among other objects of the present invention is to provide a computer system having a display device for displaying an advanced configuration and power interface specification (ACPI) state and a control method for displaying system state information.

According to the present invention, there is provided a computer system having a power management function through advanced configuration and power interface specification (ACPI) that includes:

a power management controller for controlling a power supply circuit;

a detection means for detecting an advanced configuration and power interface specification (ACPI) state;

a display means for displaying information of the advanced configuration and a power interface specification (ACPI) state and a power state;

a display controller for outputting the advanced configuration and power interface specification (ACPI) state information supplied from the detection means and the power state information supplied from the power management controller through the display means.

In a preferred embodiment of the present invention, the display means includes one of a vacuum fluorescent display (VFD) and a liquid crystal display (LCD).

According to the present invention, there is also provided a method for controlling a computer system having a power management function through advanced configuration and power interface specification (ACPI) and a function to display power management states through a special external display device including the steps of:

determining whether an operating state of a computer system is normal;

determining a step that belongs to a current state of a computer system among advanced configuration and power interface specification (ACPI) states, if the operating state of the computer system is abnormal; and displaying corresponding state information among the advanced configuration and power interface specification (ACPI) states.

In a preferred embodiment of the present invention, the method further includes a step of displaying refresh state information of an audio/video refresh function.

Also, in a preferred embodiment of the present invention, the method further includes a step of displaying information of a central processing unit (CPU) using state, a memory using state, and a current time.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF PREFERRED EMBODIMENTS

Referring to the following description, embodiments of the present invention will be discussed with reference to accompanying drawings, including FIGS. 1 through 5.

An improved computer system of the present invention has a display device for displaying advanced configuration and power interface specification (ACPI) state information and power state information. The information according to advanced configuration and power interface specification (ACPI) state change and a power state change of the system is displayed through the display device.

Figure 1:
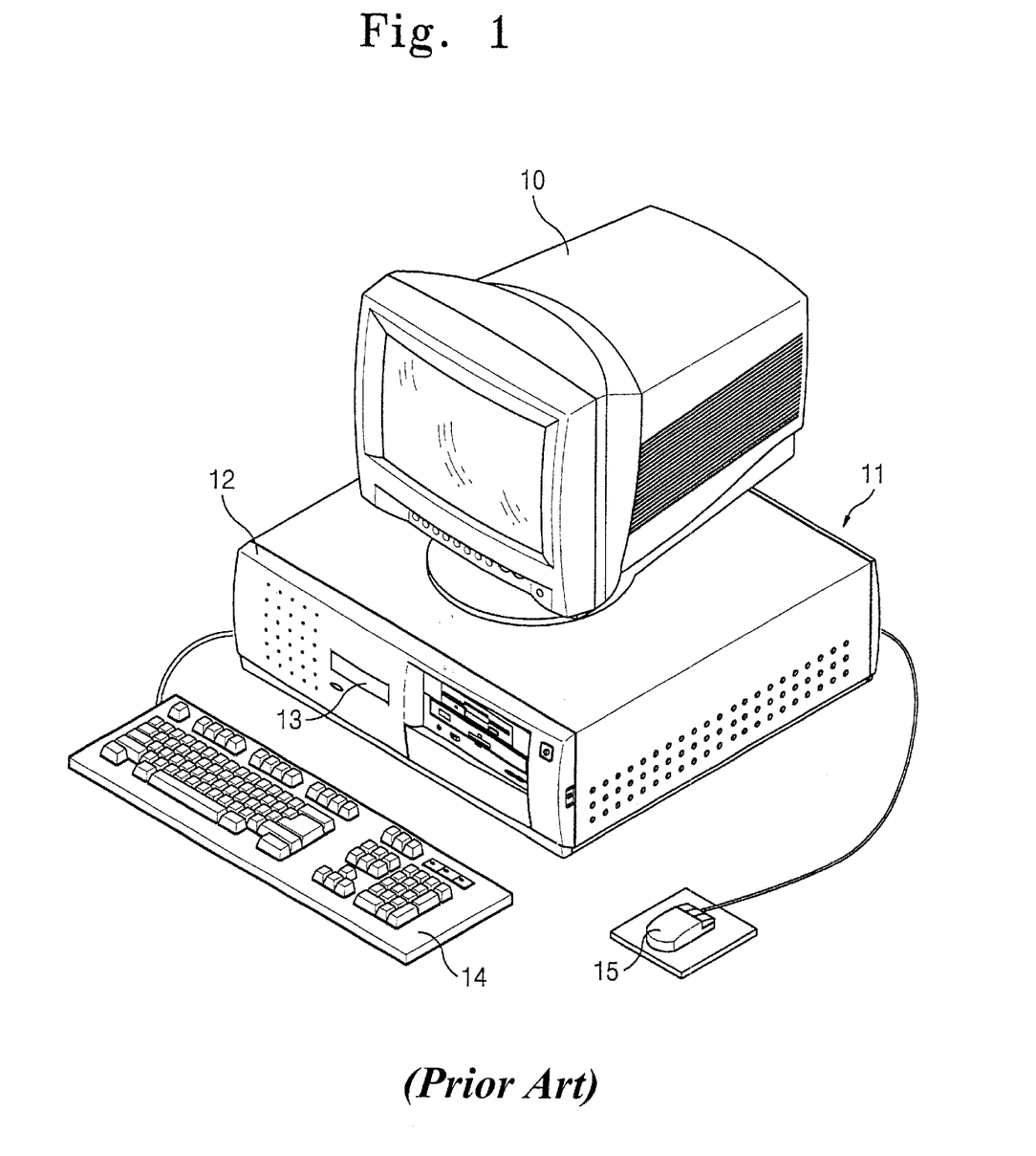
FIG. 1 is a perspective view illustrating an example of a desk-top computer.

FIG. 1 illustrates an example of a desk-top computer. Referring to FIG. 1, a desk-top computer includes a display monitor 10, a body 11, a keyboard 14, and a mouse 15. A vacuum fluorescent display (VFD) panel 13 is installed in a front bezel 12 of the computer body 11. The state data of a computer system is displayed in the vacuum fluorescent display (VFD) panel. For example, a current time and an operating state of an audio player and a video player are displayed in the vacuum fluorescent display (VFD).

Figure 2:
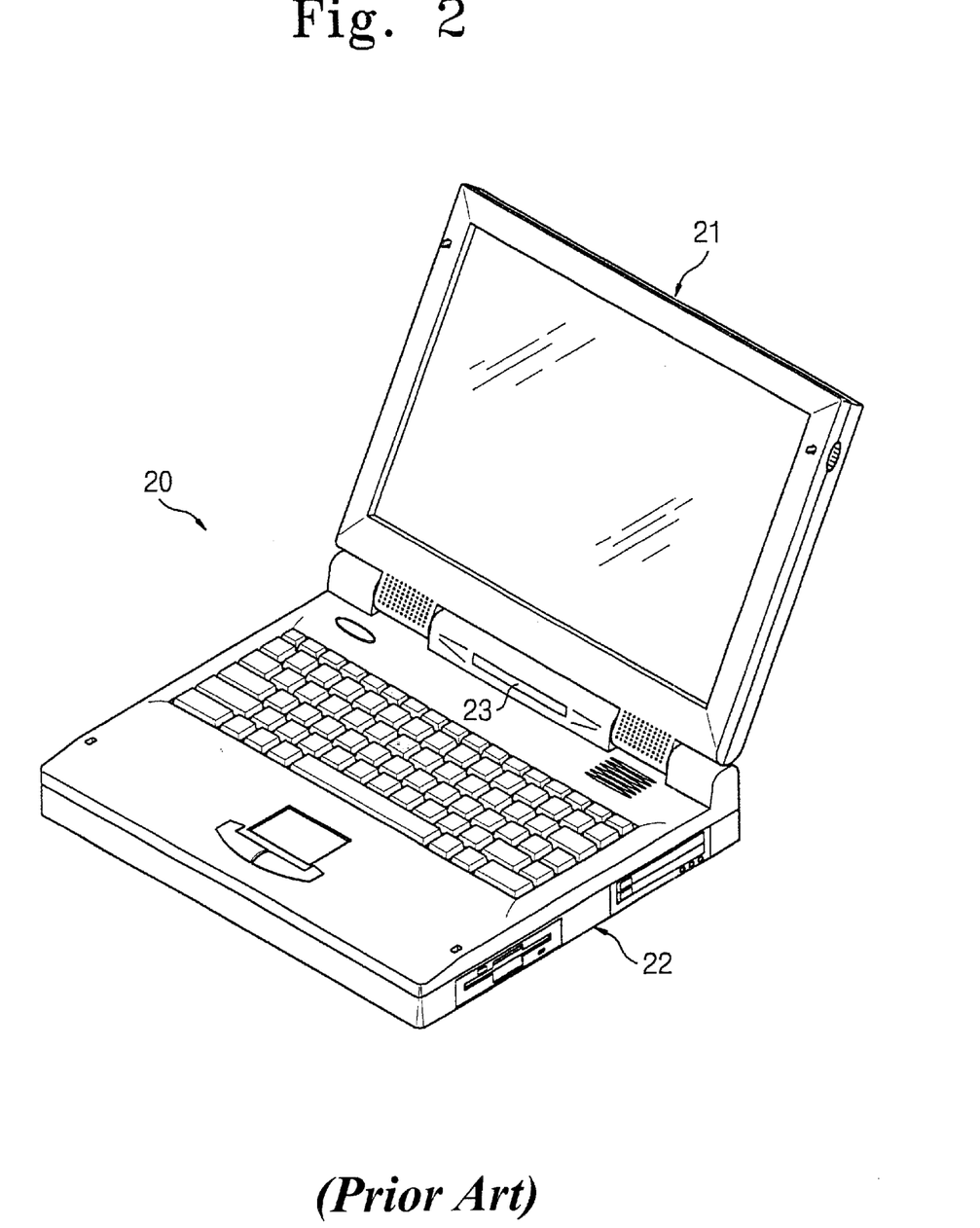
FIG. 2 is a perspective view illustrating an example of a portable computer.

FIG. 2 illustrates an example of a portable computer. Referring to FIG. 2, a portable computer 20 includes a body 22 and a hinge-combined liquid crystal display (LCD) panel 21. As described above, a small-sized liquid crystal display (LCD) panel 23 for displaying system state information is installed in the body 22. For example, the access state of a floppy disk drive and a hard disk drive is displayed in the small-sized liquid crystal display (LCD) panel.

Therefore, special display device for displaying of the computer system state information is installed in the computer system, so that a convenient use environment is supplied for a user.

As mentioned previously, a computer system possesses a power management function. A power management system (PMS) having a simple power management function is applied to the computer system in the early stage, but an advanced power management system (APMS) having advanced power management function is recently applied to the computer system. In this regard, an advanced configuration and power interface specification (ACPI) is suggested by Intel corporation, Microsoft corporation, and Toshiba corporation, for example. A detailed description of the advanced configuration and power interface specification (ACPI) is disclosed in Advanced Configuration and Power Interface Specification Reversion 1.0, for example,.

Figure 3:
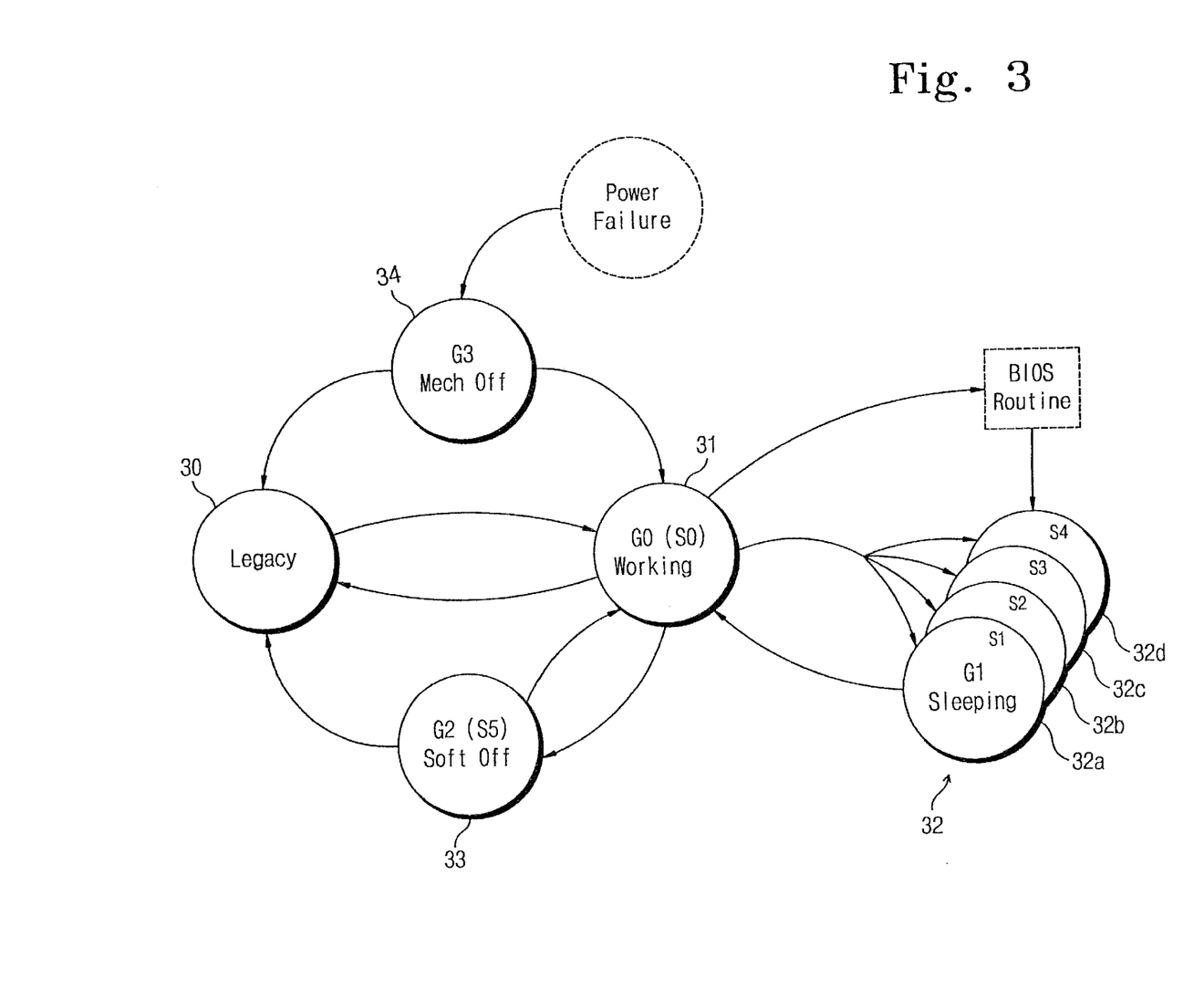
FIG. 3 is a state view illustrating states of a computer system and transition of each state.

FIG. 3 illustrates computer system states according to the advanced configuration and power interface specification (ACPI) and transition of each state. Referring to FIG. 3, the total system state of a computer system is classified into five (5) states as follows: a Legacy state 30, a G0 state 31, a G1 state 32, a G2 state 33, and a G3 state 34. The Legacy state 30 is a disable state of advanced configuration and power interface specification (ACPI) function and power management is not performed. The G0 state 31 is a working state and the computer system is normally operated. The G1 state 32 is a sleeping state and power consumption is generally reduced. The G2 state 33 is a soft off state and minimal power consumption is only generated so as to sense a soft switch (a switch for power on/off of the computer system). The G3 state is a mechanical off state and the power supply is wholly intercepted.

Continuing with reference to FIG. 3, if power is supplied when the advanced configuration and power interface specification (ACPI) function of a computer system is enabled, the computer system is classified into six (6) sleeping states S0 through S5. The sleeping states S0, S1 through S4, and S5 correspond to the G0 state, G1 state, and G2 state, respectively. According to the operating states of the computer system, in states S1 through S4 (32a through 32d), power consumption is reduced step by step in response to the operating states.

According to the state of the computer system, power consumption of devices (for example, a central processing unit (CPU), a compact disc-read only memory (CD-ROM), a hard disk drive (HDD), and a modem) installed in the computer system is reduced step by step. The steps are classified into C0 through C3 (in the central processing unit (CPU)) and D0 through D3 (in the compact disc-read only memory (CD-ROM), the hard disk drive (HDD), and the modem).

In the foregoing advanced configuration and power interface specification (ACPI), power consumption is reduced step by step in accordance with operating states of a computer system. As mentioned above, information according to the advanced configuration and power interface specification (ACPI) is not displayed in a special device for displaying state information of the computer system. Thus, a user cannot know a proceeding step of the power consumption reduced by the advanced configuration and power interface specification (ACPI) and cannot distinguish the G2 state 33 (soft off state) and the G3 state 34 (mechanical off state). Then, if a main board is changed so as to repair the computer system, the main board can be damaged owing to abruptly applied power.

Figure 4:
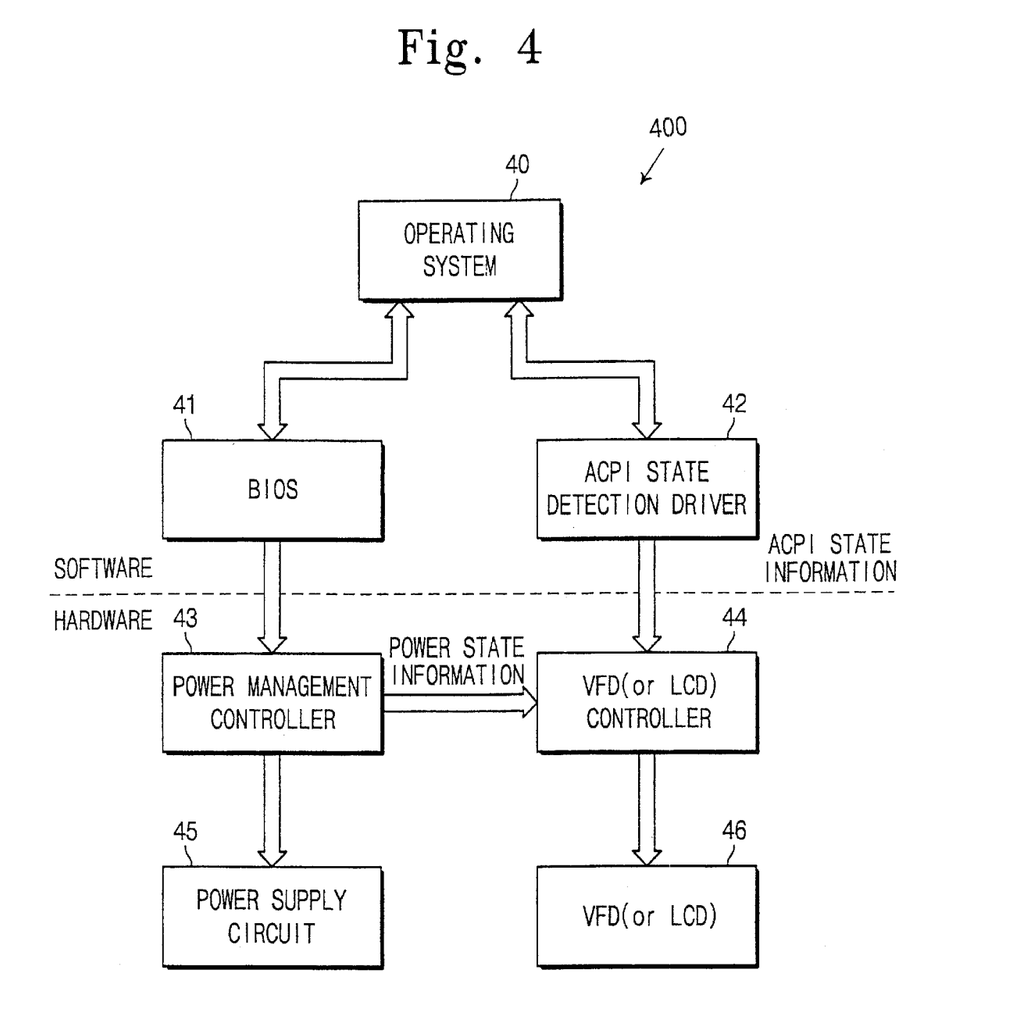
FIG. 4 is a block diagram illustrating a configuration of a computer system according to the present invention.

Continuing with reference to FIG. 4, FIG. 4 illustrates a configuration of a computer system 400 according to the present invention. Referring to FIG. 4, an operating system 40 supporting the advanced configuration and power interface specification (ACPI) is installed in the computer system 400 according to a preferred embodiment of the present invention. A detailed description of the operation of this operating system 40 is similar to the foregoing description and discussion with respect to FIGS. 1 through 3. A further detailed description is disclosed in Advanced Configuration and Power Interface Specification Reversion 1.0, for example. The computer system 400 has a power management controller 43 which controls a power supply of a power supply circuit 45 by power management information supplied from a basic input/output system (BIOS) 41 to the power management controller 43. The computer system 400 includes an advanced configuration and power interface specification (ACPI) state detection driver 42, a vacuum fluorescent display (VFD) controller 44, and a vacuum fluorescent display (VFD) 46. The vacuum fluorescent display (VFD) 46, such as can be used with the desk-top computer of FIG. 1, can be replaced as a liquid crystal display (LCD) 46, such as can be used with the portable computer 20 of FIG. 2. In this case, the vacuum fluorescent display (VFD) controller 44 should be replaced as a liquid crystal display (LCD) controller 44. A power supply of the vacuum fluorescent display (VFD) controller 44 receives an auxiliary power of 3.3 volts (V), for example, supplied from the power supply circuit 45 and then uses a controller which can be operated. If a 5 volts (V) controller is used, a special integrated circuit (IC) boosting the power from 3.3 volts (V) to 5 volts (V) should be used.

The advanced configuration and power interface specification (ACPI) state detection driver 42 detects a current advanced configuration and power interface specification (ACPI) state and then supplies advanced configuration and power interface specification (ACPI) information to the vacuum fluorescent display (VFD) controller 44. The power management controller 43 supplies power state information to the vacuum fluorescent display (VFD) controller 44. The vacuum fluorescent display (VFD) controller 44 receives the advanced configuration and power interface specification (ACPI) information and the power state information from the advanced configuration and power interface specification (ACPI) state detection driver 42 and the power management controller 43, respectively, and then generates the advanced configuration and power interface specification (ACPI) information and the power state information to the vacuum fluorescent display (VFD) 46. The advanced configuration and power interface specification (ACPI) state information and the power state information are displayed in the vacuum fluorescent display (VFD) 46, so that a user can easily confirm the current state of a computer system, such as computer system 400, by seeing the displayed information, such as the advanced configuration and power interface specification (ACPI) state information and the power state information.

Continuing with reference to FIGS. 3 and 4, the advanced configuration and power interface specification (ACPI) information displayed in the vacuum fluorescent display (VFD) 46, or in the liquid crystal display (LCD) 46, basically includes six (6) sleeping states S0 through S5 (referring to FIG. 3). Further, it is possible to display on the vacuum fluorescent display (VFD) 46 or on the liquid crystal display (LCD) 46, the several steps C0 through C3 (in case of central processing unit (CPU)) or the steps D0 through D3 (in case of a compact disc-read only memory (CD-ROM), a hard disk drive (HDD), and a modem) so that power consumption of such devices (for example, a central processing unit (CPU), a compact disc-read only memory (CD-ROM), a hard disk drive (HDD), and modem) installed in a computer system, such as computer system 400, according to a computer system state is reduced step by step. In particular, the S5 state (G2 state) as the soft off state is displayed, so that a user can know that the current state of a computer system, such as computer system 400, is not the G3 state (mechanical off state).

If the power is supplied with a portable computer, such as portable computer 20 of FIG. 2, as computer system 400, from the battery, the power state information displayed in the liquid crystal display (LCD) 46 or liquid crystal display (LCD) panel 23 of FIG. 2 includes information of remaining capacitance and usable duration of the battery. Since a user can see the power state information, the user can forecast a usable duration of the computer system 400.

As mentioned above, advanced configuration and power interface specification (ACPI) state information and power state information are displayed through a vacuum fluorescent display (VFD) 46 or liquid crystal display (LCD) 46, dependent upon the type of computer system, so that a user conveniently uses the computer system 400. The information displayed in the vacuum fluorescent display (VFD) 46 or liquid crystal display (LCD) 46 can display any other information which a user wants to show in addition to the advanced configuration and power interface specification (ACPI) state information and the power state information. For example, if an audio/video refresh function is operated, refresh state information thereof can be displayed through the vacuum fluorescent display (VFD) 46 or liquid crystal display (LCD) 46.

Figure 5:
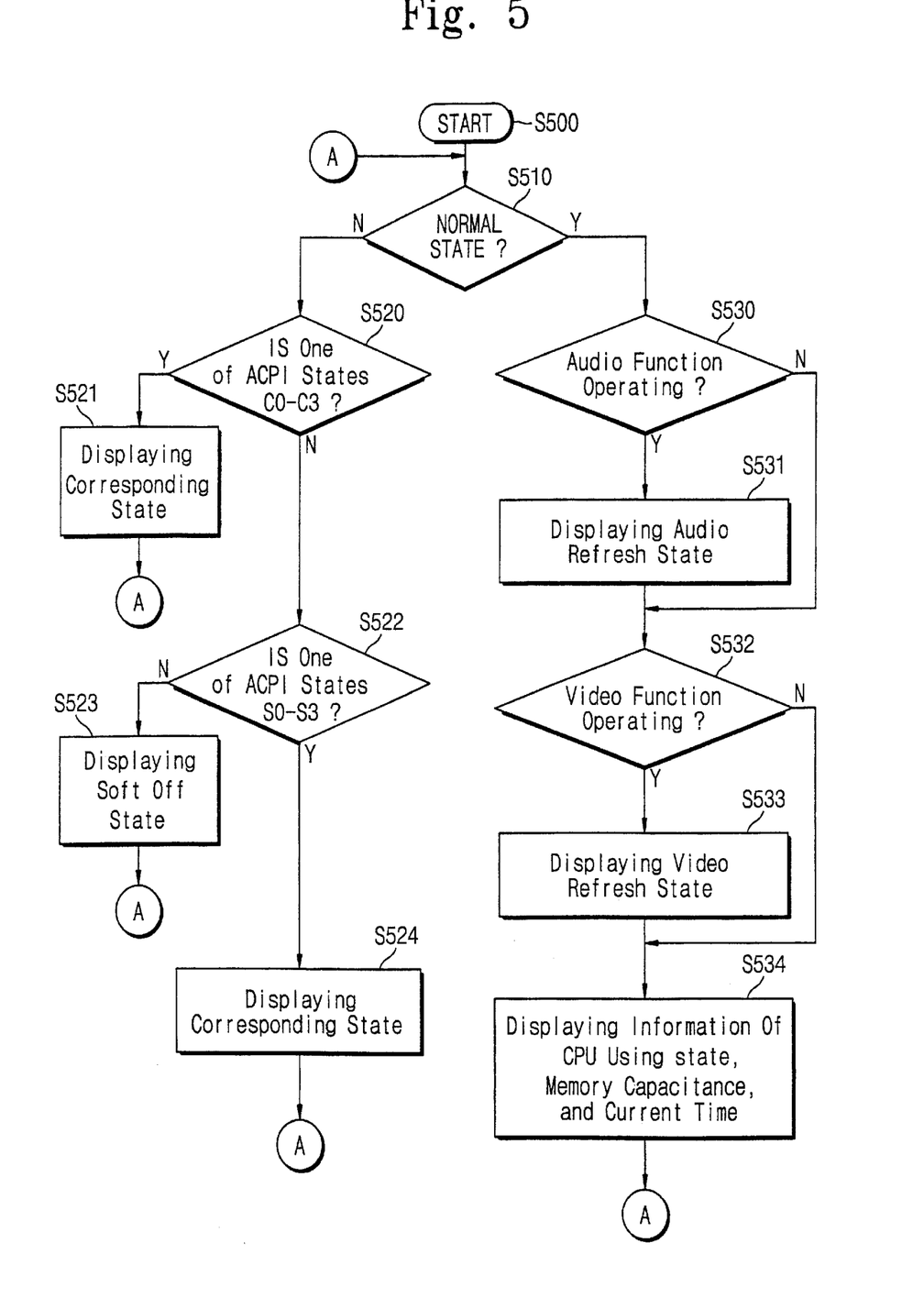
FIG. 5 is a flow chart illustrating the control steps for displaying system information of a computer system according to the present invention.

Now, continuing with reference to FIGS. 4 and 5, a control method according to the present invention of a computer system 400 having the above described functions is described in detail with particular reference to FIG. 5. FIG. 5 illustrates the control steps for displaying system information according to the present invention. The control steps are performed by the vacuum fluorescent display (VFD) controller 44 or liquid crystal display (LCD) controller 44, dependent upon the type of computer system 400.

Continuing with reference to FIG. 5, if computer system 400 is powered on in step S500, it is determined whether the state of the computer system 400 is normal in step S510. If the state of the computer system 400 is normal, the process proceeds from step S510 to step S530 and, if the state of computer system 400 is abnormal, the process proceeds from S510 to step S520.

In step S530, it is determined whether an audio function is operating. If the audio function is operating, the process proceeds from step S530 processes to step S531 and an audio refresh state is displayed on the vacuum fluorescent display (VFD) 46 or the liquid crystal display (LCD) 46. The audio refresh state can be displayed as levels on the vacuum fluorescent display (VFD) 46 or the liquid crystal display (LCD) 46. If the audio function is not operating, or upon completion of step S531, the process proceeds to step S532. In step S532, it is determined whether a video function is operating. If the video function is operating, the process proceeds from step S532 to step S533 and a video refresh state is displayed on the vacuum fluorescent display (VFD) 46 or the liquid crystal display (LCD) 46. The video refresh state can be displayed as levels on the vacuum fluorescent display (VFD) 46 or the liquid crystal display (LCD) 46. If the video function is not operating, or upon completion of S533, the process proceeds to step S534, and a using state of a central processing unit (CPU) and a memory capacitance and the current time for the computer system 400 are displayed on the vacuum fluorescent display (VFD) 46 or liquid crystal display (LCD) 46. The process then returns at "A" to step S510.

If the process proceeded from step S510 to step S520, in step S520, it is determined what step belongs to the advanced configuration and power interface specification (ACPI) state among the aforementioned C0 through C3 steps. If there is a corresponding step, the corresponding step among the C0 through C3 steps of the advanced configuration and power interface specification (ACPI) state is displayed on the vacuum fluorescent display (VFD) 46 or the liquid crystal display (LCD) 46 in step S521. The process then returns at "A" to step S510. If there is not a corresponding step among the C0 through C3 steps of the advanced configuration and power interface specification (ACPI) state, the process proceeds from step S520 to step S522 and, in step S522, it is determined what step belongs to the advanced configuration and power interface specification (ACPI) state among the aforementioned S0 through S3 steps. If there is no corresponding step among the S0 through S3 steps of the advanced configuration and power interface specification (ACPI) state, the process proceeds from step S522 to step S523 and a soft off state is displayed on the vacuum fluorescent display (VFD) 46 or the liquid crystal display (LCD) 46. The process then returns at "A" to step S510. If there is a corresponding step among the S0 through S3 steps of the advanced configuration and power interface specification (ACPI) state, the process proceeds from step S522 to step S524 and a corresponding step among S0 through S3 steps of the advanced configuration and power interface specification (ACPI) state is displayed on the vacuum fluorescent display (VFD) 46 or the liquid crystal display (LCD) 46. The process then returns at "A" to step S510.

Therefore, according to the present invention, a user can advantageously confirm a state of a computer system, such as computer system 400, such as a desk-top computer of FIG. 1 or a portable computer of FIG. 2, for example, through the vacuum fluorescent display (VFD) 46 or the liquid crystal display (LCD) 46, respectively, such as through the vacuum fluorescent display (VFD) panel 13 of the desk-top computer of FIG. 1 or through the liquid crystal display (LCD) panel 23 of the portable computer 20 of FIG. 2. A soft off state can be confirmed in the advanced configuration and power interface specification (ACPI) state, thereby preventing a main board for the computer system 400 from being damaged by a user mistake (for example, a change of the main board).

While there have been illustrated and described what are considered to be preferred embodiments of the present invention, it will be understood by those skilled in the art that various changes and modifications may be made, and equivalents may be substituted for elements thereof without departing fromthe true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A computer having a power management function through an advanced configuration and power interface specification, comprising:
 a power management controller regulating a power supply circuit of the computer, the power management controller providing state information of a power state of the computer;
 a detector detecting state information of an advanced configuration and power interface specification state of the computer, the detector providing state information of the advanced configuration and power interface specification;
 a display controller outputting said state information of the advanced configuration and power interface specification supplied from said detector and outputting said state information of the power state supplied from said power management controller;
 a first display displaying virtual variable images generated by an operating system installed on said computer; and
 a second display displaying said state information of the advanced configuration and power interface specification and said state information of the power state received from said display controller.

2. The computer of claim 1, further comprised of said second display comprising one of a vacuum fluorescent display and a liquid crystal display.

3. The computer of claim 1, further comprised of said computer being a portable computer.

4. The computer of claim 3, said first display and said second display both being liquid crystal displays.

5. The computer of claim 1, said computer being a desk-top computer.

6. The computer of claim 5, said second display being a vacuum fluorescent display.

7. A computer, comprising:
 a power management controller regulating a power supply circuit of the computer, the power management controller providing information of a power state of the computer;
 a detector detecting an advanced configuration and power interface specification state of the computer, the detector providing information of the advanced configuration and power interface specification state;
 a display controller outputting said information of the advanced configuration and power interface specification state supplied from said detector and outputting said information of the power state supplied from said power management controller; and
 a display device displaying said information of the advanced configuration and power interface specification state and said information of the power state received from said display controller.

8. The computer of claim 7, said display device comprising one of a vacuum fluorescent display and a liquid crystal display.

9. The computer of claim 7, said computer being a portable computer.

10. The computer of claim 7, said computer being a desk-top computer.

11. The computer of claim 7, said display device being a separate display from a display for the computer.

12. A method for controlling a computer having a power management function through an advanced configuration and power interface specification, comprising the steps of:
 determining whether an operating state of the computer is one of a normal state and an abnormal state;
 determining what state of an advanced configuration and power interface specification state belongs to a current state of the computer among advanced configuration and power interface specification states when said operating state of the computer is in the abnormal state; and
 displaying on a display device of the computer said current state information among said advanced configuration and power interface specification states.

13. The method of claim 12, further comprising the step of displaying refresh state information of any one of an audio refresh function and a video refresh function when said operating state of the computer is in the normal state.

14. The method of claim 12, further comprising the step of displaying information of any one of a central processing unit using state, a memory using state, and a current time for the computer when said operating state of the computer is in the normal state.

15. The method of claim 14, further comprising the step of displaying refresh state information of any one of an audio refresh function and a video refresh function when said operating state of the computer is in the normal state.

16. The method of claim 12, further comprising the step of displaying said corresponding state information among said advanced configuration and said power interface specification states on a said display device separate from a display for the computer.

17. The method of claim 16, further comprised of said display device being an external display device of the computer.

18. The method of claim 12, said computer being a portable computer.

19. The method of claim 18, said display device being a liquid crystal display.

20. The method of claim 12, said computer being a desk-top computer.

21. The method of claim 20, said display device being a vacuum fluorescent display.

22. The method of claim 12, said display device comprising one of a vacuum fluorescent display and a liquid crystal display.

23. A method for controlling a computer having a power management function through an advanced configuration and power interface specification, comprising the steps of:

displaying virtual variable images on a first display, said virtual variable images being based on an operating system installed on said computer;

determining whether an operating state of the computer is one of a normal state and an abnormal state;

determining what state of an advanced configuration and power interface specification state is a current state of the computer among advanced configuration and power interface specification states; and displaying on a second display of the computer said current state information among said advanced configuration and power interface specification states.

24. The method of claim 23, further comprising the step of displaying refresh state information of any one of an audio refresh function and a video refresh function of the computer on said second display.

25. The method of claim 23, further comprising the step of displaying information of any one of a central processing unit using state, a memory using state, and a current time for the computer on said second display.

26. The method of claim 25, further comprising the step of displaying refresh state information of any one of an audio refresh function and a video refresh function of the computer on said second display.

27. The method of claim 23, said computer being a portable computer.

28. The method of claim 27, said first and said second displays both being liquid crystal displays.

29. The method of claim 23, said computer being a desk-top computer.

30. The method of claim 29, said second display being a vacuum fluorescent display.

\* \* \* \* \*